United States Patent Office 3,558,536
Patented Jan. 26, 1971

3,558,536
AQUEOUS LATEX PAINTS INTERNALLY PRIMED WITH HYDROXY FUNCTIONAL PARTIAL ESTERS OF RESINOUS POLYHYDRIC ALCOHOLS
Kazys Sekmakas, Chicago, Ill., assignor to De Soto Inc., Chicago, Ill., a corporation of Delaware
No Drawing. Filed Aug. 16, 1967, Ser. No. 660,930
Int. Cl. C09d 3/80, 5/02
U.S. Cl. 260—23            11 Claims

ABSTRACT OF THE DISCLOSURE

Synthetic polymer latex coating compositions are internally primed by incorporating in the aqueous phase of the latex an hydroxy functional hydrophilic resin produced by esterifying a resinous polyhydric alcohol, such as a solution copolymer of styrene and allyl alcohol, with a long-chain fatty acid. The fatty acid is used in an amount to esterify at least 25% of the hydroxy groups. Carboxy functionality can be incorporated by adducting unsaturated carboxylic acids with unsaturation in the fatty acid, or by reacting a polycarboxylic monoanhydride with residual hydroxy groups on the polyhydric alcohol. The carboxy functionality is provided in substantial excess of the acidity which is finally desired. Reaction with a stoichiometric deficiency of monoepoxide is then had to reduce the acid number to at least about 70 and to generate hydroxy groups remote from the backbone of the polymer. The hydroxy value is at least 15 and provides the necessary hydrophilicity. The resulting hydrophilic resins can be dispersed in water with the aid of a base in the form of very fine particles despite the low acid number and high proportion of hydrophobic fatty acid.

---

The present invention relates to water dispersed coating compositions in which a synthetic polymeric latex is modified by having introduced therein a proportion of water soluble resin in order that the latex possesses improved self-priming properties to enable the same to adhere well to new wood surfaces or to painted surfaces which have chalked upon exposure. The primer compositions are primarily intended for adhesion to surfaces that have been previously painted with zinc oxide-containing paints. As will be evident from the utilities indicated, the invention is particularly directed to pigmented housepaints, especially those intended for exterior application.

In the prior art, the water soluble materials which were incorporated into the latex were oily materials, e.g., they were esters of long chain fatty acids (both saturated and unsaturated) with the affinity of the oily hydrophobic resin for water being achieved through salt formation. However, and since the resins of the prior art were oily hydrophobic materials incorporated in water primarily through salt formation with acid groups in the resin, it was not possible to disperse these oily hydrophobic resins in fine particle size except when the resins prior to salt formation possessed excessive acidity. The problem of adequate dispersion is especially difficult when the hydrophobic resin possesses moderate molecular weight as opposed to a simple maleinized oil, which has very low molecular weight.

In accordance with the present invention, a resinous polyhydric alcohol is extensively esterified with long chain fatty acid in order to provide good compatibility with the chalky oil-based paint surfaces which it is intended to over-coat. The partial fatty ester provided in this manner is then reacted with a compound which provides carboxy functionality. If anhydride groups are present in the reaction product, these are removed by hydrolysis. The carboxyl functionality is generated in an amount in excess of the acidity which is finally desired. In order to minimize the proportion of acid used as well as the amount of residual hydroxy functionality required in the polyhydric alcohol, unsaturated acids like maleic or fumaric acid are preferably used and these are adducted with unsaturation in the fatty acid used for esterification. Reaction is then had with a monoepoxide in order to reduce the acidity to the level desired while generating a plurality of hydroxy groups remote from the backbone of the polymer in order to insure that any hydrophobicity introduced by the fatty acid is overcome to provide an hydroxy functional resin which is essentially hydrophilic and which can be dispersed in water with the aid of a base in the form of very fine particles despite the fact that the acid value of the resin is less than 70, preferably in the range of from 15–60. In this way, and despite the presence of large proportions of fatty acid which provide the compatibility which is needed, soluble materials are provided which form finely divided colloidal solutions when dissolved in water with the aid of a base and which, in a mixture with latex paints, provide excellent self-priming action at the same time that they permit the application of paint films which possess superior resistance to corrosion. A small amount of water miscible organic solvent is also desirably used to enhance water solubility.

When the proportion of long-chain fatty acid is minimized, and where the proportion of compound providing carboxy functionality is maximized, adequate water dispersibility can be achieved at very low acid numbers, e.g., as low as about 5.

Referring more particularly to the water soluble resins which are used in the invention, these are based on resinous polyhydric alcohols which may contain from 2 to 20% by weight of hydroxy groups. The preferred resinous polyhydric alcohols are addition copolymers produced by solution polymerization of monomers including hydroxy functional monomer. However, hydroxy functional polyesters can also be used. Similarly, it is preferred that the hydroxy group be the only functional group available in the resin, but small proportions of the carboxy group do not interfere.

A preferred resinous polyhydric alcohol is a copolymer consisting essentially of a vinyl aromatic compound with an allyl alcohol. The preferred vinyl aromatic compound is styrene, but vinyl toluene is also useful. Allyl alcohol and methallyl alcohol are the preferred alcohols and these preferably are used to provide from 3 to 15%, more preferably from 4 to 10%, by weight of hydroxy groups based on the resinous polyhydric alcohol.

The solution copolymerization referred to is wholly conventional. As is well known, the monomers are polymerized in solution to form a polymer which is soluble in the organic solvent selected and the reaction is carried out in the presence of free-radical polymerization catalyst. Catalyst selection is wholly conventional and is illustrated by t-butyl perbenzoate, cumene hydroperoxide and benzoyl peroxide. Appropriate resinous polyhydric alcohols are well known and readily available in commerce.

The resinous polyhydric alcohols referred to above are reacted with a long chain fatty acid to esterify at least 25% of the hydroxy groups which are available on the resinous polyhydric alcohol. The reaction is conducted to substantially completely consume the acidity of the fatty acid. It is preferred to employ as much fatty acid as possible, consistent with other objectives of the invention, since the fatty acid is inexpensive and since it provides desirable compatibility with the oil-based paints which are frequently encountered on the substrate to be painted.

The term "long chain fatty acid" identifies saturated and unsaturated aliphatic monocarboxylic acids containing 8 or more carbon atoms in the molecule, these acids being normally derived from commercially available vegetable oils such as linseed oil, oiticica oil, soya bean oil, coconut oil and the like. Of these, the drying oils, including semidrying oils and frosting oils, are preferred. The useful fatty acids are well known per se and are illustrated by linseed fatty acids, soya fatty acids and tall oil (a term which identifies the acid and not the oil).

As previously indicated, the fatty acid is used in an amount to esterify at least 25% of the hydroxy groups of the resinous polyhydric alcohol. When the compound which provides carboxy functionality is unsaturated, acidity can be added by adduction without consuming additional hydroxy groups in the polyhydric alcohol. In such instance, more of the hydroxy groups of the resinous polyhydric alcohol can be consumed by reaction with fatty acid, and this is preferred. In this latter situation, the fatty acid is preferably used in an amount to esterify at least 90% of the hydroxy groups of the resinous polyhydric alcohol. In this way, the water insoluble aromatic groups of the starting material are more completely blocked and compatibility with oily materials is enhanced.

The compound which supplies carboxy functionality to the fatty acid ester of the resinous polyhydric alcohol can be of various types depending upon whether it is to be bound to the fatty acid ester by adduction with unsaturation in the fatty acid or by esterification with residual hydroxy groups in the partially esterified product.

When the carboxy functionality is added by adduction, the acid used must be monoethylenically unsaturated as previously indicated, though it may be monocarboxylic or polycarboxylic. Suitable acids are fumaric acids, maleic acids, acrylic acid and the like; the dicarboxylic acids being preferred. On the other hand, and if the acid is saturated, then it must be polycarboxylic in order that carboxyl functionality remains after reaction. Moreover, the polycarboxylic acid must be a monoanhydride in order that the reaction can be restricted to the single anhydride group to thereby prevent cross-linking. The reaction is an addition reaction which opens the anhydride ring to generate a carboxylic acid group. Thus succinic anhydride, phthalic anhydride, hexahydrophthalic anhydride, etc., may be used to generate a single carboxyl group by reaction with residual hydroxy groups in the partially esterified resinous polyhydric alcohol. Similarly, trimellitic anhydride may be used to advantageously provide two carboxyl groups for each trimellitic group which is reacted into the polymer. Another trifunctional monoanhydride is alpha(2-carboxyethyl)-glutaric anhydride.

When an unsaturated anhydride such as maleic anhydride is reacted by adduction with an unsaturated moiety in the fatty acid, then the adduct should be hydrolyzed to replace the anhydride group with a pair of carboxy groups. The adductive reaction is frequently a Diels-Alder reaction and is facilitated by the presence of a catalyst such as iodine.

The component which provides the carboxy functionality is incorporated in an amount to provide an acid number of at least 30, preferably at least 60. Larger acid numbers can be used, but normally an acid number above 200 is undesirable because the cost of providing it and then consuming most of it is excessive.

The preferred partial esters have an acid value of from 60 to 150, and at least 40% of the acidity is consumed by reaction with monoepoxide to form an hydroxy ester of reduced acidity as has been previously described. The reaction with monoepoxide serves to eliminate undesirable acidity while, at the same time, providing reactive hydroxy groups which are removed from the backbone of the polymer.

Various monoepoxides may be used to reduce the acidity of the adduct, and to generate hydrophylicity, but the preferred oxides are ethylene oxide, propylene oxide, butylene oxide and glycidyl ester of tertiary monocarboxylic acids and mixtures thereof.

Alpha-branched saturated monocarboxylic acids and especially tertiary fatty acids in the form of a glycidyl ester are quite good and have been found to be of unique value in providing reactive hydroxy esters which are fully compatible with water and which help to provide desirable physical properties in the final resin product. These have the formula:

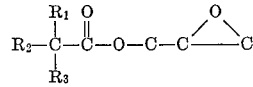

in which $R_1$ and $R_2$ are alkyl radicals having a chain length of from 2–18 carbon atoms and $R_3$ is the same as $R_1$ and $R_2$ or hydrogen.

The epoxide must be used in stoichiometric deficiency. This is because the reaction with the epoxide groups is rapid and it is normally intended to consume substantially all of the epoxy reactivity which is present. In this way, stable compositions are produced which contain a residual acidity easily identified by the acid number of the product.

Preferably, the epoxide is used in a stoichiometric deficiency of at least 5%. From the standpoint of preferred practice, the epoxy component is used in an amount sufficient to esterify (as by the formation of hydroxy ester groups) from 40 to 80% of the carboxyl groups which are available for esterification. The consumption of these carboxyl groups can be easily followed by observing the acid number of the product as it is reduced.

The reaction of the monoepoxide with the carboxy groups is preferably assisted and made specific by the presence of a small proportion of alkaline catalyst. The preferred alkaline catalysts are volatile, e.g., amines. Particularly preferred are tertiary amines such as triethyl amine and quaternary ammonium salts such as trimethyl benzyl ammonium chloride. These alkaline materials are reactive with the acid groups of the polymer and appear to remain associated as salts with the residual carboxyl functionality of the resin.

As will be understood, the reaction with monoepoxide generates hydroxy functionality in addition to any residual hydroxy functionality which may be present in the resin. The final product should have an hydroxy value of at least about 15, preferably at least 25. While it is theoretically possible to produce resins with a high hydroxy functionality, an hydroxy value in excess of 150 would be unusual.

The reaction between the fatty acid and the polyhydric resin is preferably carried out in organic solvent solution using a small proportion of aromatic solvent to facilitate complete reaction. These are desirably stripped off when the reaction is complete. When the final resin is produced by reaction with monoepoxide, it is preferred that at least a small amount of a water miscible organic solvent be present. Appropriate water miscible solvents are dioxane, ethanol, isopropanol, 2-ethoxy ethanol, methyl ethyl ketone, 2-ethoxy ethanol acetate, propyl alcohol, butoxy ethanol 2-ethoxy diethylene glycol, 2-butoxy diethylene glycol, etc. The water miscible solvent helps to achieve fine particle size when the resin is dispersed in water.

The utilization of appropriate hydrophilic resins is easily noted by the achievement of dispersions of fine particle size despite the use of resins of low acid number. Thus, and with the conventional hydrophobic resins, an average particle size in the aqueous dispersion of less than 0.5 micron is not obtainable when the acid number of the resin is less than 70. In contrast, the average particle size utilized in the present invention is less than 0.5 micron and, as pointed out previously, this is achieved with resins of low acid value. Indeed and in the preferred practice of the invention, the average particle size is less than 0.1 micron and the acid number is desirably less than 60.

It is of interest to observe that the prior art oleophilic materials and which have an acid number typically of about 100 tend to be unstable at elevated temperature in admixtures with synthetic polymer latices. In contrast, the products of the invention exhibit improved stability under elevated temperature storage conditions which is of considerable importance in the field of aqueous paints where it is not unusual for premixed paints to be stored for long periods of time in warehouses where they are exposed to elevated temperatures during summer storage.

When using alcoholic solvents, it will be appreciated that the capacity to selectively react the epoxy group with the carboxylic acid groups is of the utmost importance for, otherwise, the epoxy groups would react with the hydroxy groups of the solvent.

When we consider the reaction which takes place in greater detail, it will be recognized that the epoxy compound reacts with the carboxylic acid groups of the polymer by addition, such reaction taking place with reasonable rapidity at moderately elevated temperatures at which condensation does not take place. This is what permits extensive reaction with monoepoxide without gelation. Thus, one need merely heat the mixture until the acidity of the system is lowered while avoiding such excessive temperatures as will cause condensation to take place. Appropriate temperatures are in the range of from 150° F. to 350° F. A temperature of about 200–300° F. is particularly appropriate because the reaction with epoxide is reasonably rapid and there is little tendency for any condensation reaction.

The resins of the invention are normally provided in organic solvent solution containing from 50 to 95% by weight of resin, preferably from 70 to 90% by weight of resin dissolved in water miscible organic solvent solutions. These solutions are readily dispersible in water with the aid of a base, sufficient base being used to provide a pH above 6.0, preferably above 7.0. A preferred pH would be in the range of pH 7.5–pH 10.

The preferred bases are volatile bases such as ammonia or organic amines illustrated by triethyl amine. The class of volatile bases useful for dispersing resins in water is well known and will not be discussed at length.

Typical practice is illustrated by placing the water soluble resins of the invention in water medium to form a solution containing about 50% resin solids. This water solution is added directly to the aqueous latex which it is intended to modify.

As is conventional in water dispersed coating compositions based on a synthetic polymer latex, the unmodified latex contains about 50% of polymer solids, these frequently being butadiene-styrene latices, though it will be appreciated that any synthetic polymer latex used in emulsion form in water based paints may be modified in accordance with the present invention. Thus, and from the broader standpoint, examples of suitable copolymer latices are diolefin-vinyl aromatic hydrocarbons copolymers such as copolymers of styrene and butadiene; 4-chlorostyrene and butadiene; styrene and isoprene; 4-chlorostyrene and isoprene; 3-chlorostyrene and butadiene; 2-chlorostyrene and butadiene; butadiene and a monomethyl styrene containing the methyl radical as a nuclear substituent; butadiene and acrylonitrile; isoprene and acrylonitrile; butadiene, styrene and ethyl acrylate; or styrene, butadiene and methyl methacrylate. In addition to the above-described latices, it is also possible to employ other synthetic polymeric latices such as polystyrene, polyvinyl toluene or polyvinylidene chloride latices, acrylate and methacrylate latices, for example, styrene-alkyl acrylate latices, vinyl acetate latices, and the like. Preferably the diolefin latices contain from about 40 to 80 mole percent of a diolefin chemically combined with the other polymerizable organic compound. Latices of styrene and butadiene-1,3 are preferably utilized. Of the nondiolefin containing latices, the styrenealkyl acrylate latices are preferred. In some instances, modification of the latices with unsaturated carboxylic acids may be desirable.

In addition, the latex may be modified to include reactive monomers such as glycidyl methacrylate in order that improved water and weather resistance may be obtained utilizing a cure which is operative by mere air drying and in the absence of a separate baking step.

The materials of the present invention are dispersed in said latices in an amount of from 2–45% by weight, preferably from 5–25% by weight on a resin solids content, e.g., the weight of resin solids added to the dispersion in comparison with the weight of resin in the latex, e.g., the pigment is excluded.

The pigmentation which is used is of secondary significance, but it is common to pigment outdoor emulsion paints utilizing zinc oxide in admixture with titanium dioxide and a pigment to binder ratio of about 1.4:1. The usual pigmentation also normally includes a proportion of calcium carbonate.

The invention is particularly applicable to the modification of latices of paints which are intended for application outdoors and these are frequently based upon acrylic aqueous emulsion polymers at least 95% by weight of which are constituted by ethyl acrylate and methyl methacrylate in a weight ratio of about 2:1. While these acrylic emulsions possess numerous desirable properties, they are particularly deficient in their capacity to adhere to substrate which have been coated with zinc oxide-pigmented oil paints and then weathered. Present commercial acrylic emulsion housepaints do not adhere to such surfaces even when blended with water dispersible polyesters intended to improve adhesion to prepainted surfaces.

The invention is illustrated in the following examples.

EXAMPLE 1.—PREPARATION OF UNSATURATED PARTIAL ESTER ADDUCT

Charge into reactor. Heat to 250° C. Hold for acid value 14–15 while removing water. Cool to 120° C.:

|  | Parts by weight |
|---|---|
| Tall oil fatty acids | 1020 |
| Styrene-allyl alcohol (6% by weight hydroxy) | 930 |
| Xylol | 75 |

Add maleic anhydride and iodine dispersed in xylol. Heat to 220–225° C. and hold for 2 hrs. Use nitrogen sparge to blow-off xylol with nitrogen:

|  | Parts by weight |
|---|---|
| Maleic anhydride | 149.55 |
| Iodine | 1.77 |
| Xylol | 17.10 |

EXAMPLE 2.—PREPARATION OF HYDROPHILIC RESINS

Heat to 90–95° C. and hold for 2 hrs. to hydrolyze anhydride groups and obtain an acid value of 92:

|  | Parts by weight |
|---|---|
| Adduct of Example I | 523.5 |
| Water | 7.0 |

Add:

|  | Parts by weight |
|---|---|
| Benzyl trimethyl ammonium chloride (60% solution) | 27.0 |

Add over 20–30 minutes at 100–115° C. Hold at 120–130° C. for acid value of 45–50:

|  | Parts by weight |
|---|---|
| Butylene oxide | 27.0 |
| 2-ethoxy ethanol | 50.0 |

Final characteristics of hydrophilic resin

| | |
|---|---|
| Solids (percent) | 85.08 |
| Acid value | 50.0 |

EXAMPLE 3

The resin solution of Example 2 is formulated into a fine aqueous dispersion by mixing 100 parts of the product of Example 2 (resin solution in water miscible organic solvent) with 70 parts of water and enough triethyl amine to bring the pH of the dispersion to 8.5.

EXAMPLE 4

An acrylic copolymer latex is prepared in a polymerization reactor equipped with an agitator, a reflux condenser, a thermometer, an inlet for nitrogen, and a separatory funnel for adding monomeric materials. The reaction procedure is as follows:

PREPARATION OF ACRYLIC LATEX COPOLYMER

Add aqueous charge. Pass a slow stream of nitrogen into the kettle to displace air and begin agitation and heating. Heat to 170° F.:

| | Parts by weight |
|---|---|
| Water | 1150 |
| Sodium lauryl sulfate | 8 |
| Nonylphenoxy polyethylene ethanol | 24 |
| Sodium bicarbonate | 1 |
| Potassium persulfate | 3 |

Combine the monomers and add slowly from the addition funnel over 2½ hours keeping the temperature at 170–175° F. When the monomer addition is complete hold the temperature at 170° F. for about one hour, so that reaction will go to completion. Cool the product to room temperature while stirring:

| | Parts by weight |
|---|---|
| Ethyl acrylate | 640 |
| Methyl methacrylate | 310 |
| Glycidyl methacrylate | 20 |

Add ammonium hydroxide to emulsion to adjust pH to 8.5–10.5:

| | Parts by weight |
|---|---|
| Ammonium hydroxide (28%) | 30 |

The final characteristics of emulsion copolymer

| | |
|---|---|
| Solids (percent) | 45.3 |
| Viscosity (centipoises-Brookfield) | 50 |
| pH | 9.8 |
| Consistency | Smooth |

EXAMPLE 5

A modified acrylic latex coating composition is prepared by mixing 4.8 parts of the dispersion of the hydrophilic resin of Example 3 with 100 parts of acrylic latex of Example 4. The resulting composition contains 5% of the hydrophilic resin of the invention, based on the total weight of resin.

The modified latex is pigmented using a pigment mixture of 26% zinc oxide, 26% titanium dioxide, and 48% calcium carbonate. The pigment is added to provide a pigment to binder ratio of 1.4:1.

While the acrylic emulsion of Example 4 exhibits good adhesion to oil paints and represents an acrylic emulsion of superior quality, it shows poor adhesion to weathered zinc oxide-containing paints. When the hydrophilic resin of the invention is added as in the present example, adhesion to weathered zinc oxide-containing paints is excellent and other desirable properties are not harmed. Adhesion to zinc oxide-containing paints is maintained even after repeated subjection to freezing and thawing.

The following example exemplifies that aspect of the invention wherein carboxy functionality is incorporated by condensation with residual hydroxy functionality on the polyhydric alcohol.

EXAMPLE 6.—PREPARATION OF HYDROPHILIC RESIN

Charge into reactor. Heat to 220° C. Hold for an acid value of 4–5. Distill off xylol. Cool to 100° C.:

| | Parts by weight |
|---|---|
| Styrene-allyl alcohol copolymer (6% hydroxy) (Eqv. weight: 300) | 1050 |
| Soya fatty acids | 450 |
| Xylol | 60 |

Add. Reheat to 100–110° C. Hold for an acid value of 50–55:

| | Parts by weight |
|---|---|
| Methyl ethyl ketone | 160 |
| Trimellitic anhydride | 150 |

Add. Reheat to 100–110° C. Hold for an acid value of 15–17:

| | Parts by weight |
|---|---|
| Triethyl amine | 20 |
| Butylene oxide | 110 |

Final characteristics

| | |
|---|---|
| Solids (percent) | 84.9 |
| Viscosity (Gardner-Holdt) | $Z_4$ |
| Color (Gardner) | 5–6 |
| Acid value | 15 |

EXAMPLE 7

The hydrophilic resin of Example 6 is placed in 50% solids solution using water and triethyl amine to provide a pH of 9.0 and this dispersion is used in the acrylic emulsion system of Example 5 in place of the same amount of the dispersion of Example 3. Similar results are achieved although the lower acid number of the resin of Example 6 enables the formation of a more weather resistant coating.

EXAMPLE 8

Example 6 is repeated using the same weight proportion of an oil-free hydroxy functional polyester resin in place of the styrene-allyl alcohol copolymer used in Example 6. The polyester is prepared using a large excess of hydroxy functional components as follows:

PREPARATION OF HYDROXY FUNCTIONAL POLYESTER RESIN

Charge into a reactor equipped with an agitator, reflux condenser, Dean-Stark trap, and nitrogen inlet tube. Heat to 215° C. and hold until homogeneous while distilling-off water of esterification:

| | Parts by weight |
|---|---|
| Hydrogenated bisphenol "A" | 928 |
| Trimethylol propane | 130 |
| Isophthalic acid | 264 |
| Triphenyl phosphite | 2 |
| Xylene | 15 |
| 2-ethoxy ethanol acetate | 5 |

When resin becomes clear, add azelaic acid. Reheat to 240° C. and hold for an acid value of 10. When acid value is reached add solvent:

| | Parts by weight |
|---|---|
| Azelaic acid | 266 |

Add to 80% solids:

| | Parts by weight |
|---|---|
| Methyl isobutyl ketone | 349 |

Final characteristics of hydroxy functional polyester

| | |
|---|---|
| Solids (percent) | 79.5 |
| Acid value | 11.0 |

The above solution in an amount of 1320 parts is used in place of the 1050 parts of allyl alcohol copolymer in Example 6. Approximately comparable results are obtained.

The invention is not to be construed by any abstract of disclosure, but its features are instead characterized in the description given hereinbefore and is defined in the claims which follow.

I claim:
1. An aqueous housepaint intended for exterior application comprising a synthetic polymer latex constituted by an acrylic aqueous emulsion copolymer comprising at least 95% by weight of acrylate and methacrylate esters, said latex having dispersed therein from 2–45% based on the weight of resin in said latex of an hydroxy func- tional hydrophilic resin which is dispersible in water with the aid of a base and which comprises a resinous polyhydric alcohol consisting of addition copolymers produced by solution polymerization of monomers including vinyl aromatic compound and hydroxy functional monomers providing 2 to 20% by weight of the hydroxy group, said resinous polyhydric alcohol being reacted with fatty acid to form a partial ester wherein said fatty acid esterifies at least 25% of the hydroxy groups on said polyhydric alcohol, said partial ester being reacted with a compound providing carboxy functionality, said compound being selected from the group consisting of ethylenically unsaturated carboxylic acids and polycarboxylic acid monoanhydrides to provide an acid number of at least 30, at least a portion of the acid functionality of said partial ester being consumed by reaction with a stoichiometric deficiency of monoepoxide to generate hydroxy groups remote from the backbone of the polymer droxy groups remote from the backbone of the polymer, said reaction being conducted to reduce the final acid value to the range of from 5 to 70 and to provide an hydroxy value of at least 15.

2. A housepaint as recited in claim 1 in which said polyhydric alcohol is a solution copolymer of styrene copolymerized with allyl alcohol and contains from 4 to 10% by weight of the hydroxy group.

3. A housepaint as recited in claim 1 in which said fatty acid is a drying oil fatty acid and monoethylenically unsaturated dicarboxylic acid is adducted therewith.

4. A housepaint as recited in claim 3 in which said fatty acid is used in an amount to esterify at least 90% of the hydroxy groups of said resinous polyhydric alcohol.

5. A housepaint as recited in claim 1 in which said carboxyl functionality is provided by the addition esterification reaction of a polycarboxylic monoanhydride with residual hydroxy groups on said resinous polyhydric alcohol.

6. A housepaint as recited in claim 5 in which said polycarboxylic monoanhydride is a tricarboxylic monoanhydride.

7. A housepaint as recited in claim 6 in which said tricarboxylic monoanhydride is trimellitic anhydride.

8. A housepaint as recited in claim 1 in which said monoepoxide is selected from the group consisting of ethylene oxide, propylene oxide, butylene oxide, glycidyl esters of tertiary monocarboxylic acids and mixtures thereof.

9. A housepaint as recited in claim 1 in which said carboxy functionality is present before reaction with said monoepoxide in an amount to provide an acid number of from 60 to 150, and said monoepoxide is used in a stoichiometric deficiency of at least 5% and reacted to esterify at least 40% of the carboxyl groups which are available for esterification.

10. A housepaint as recited in claim 1 in which said aqueous emulsion copolymer consists essentially of ethyl acrylate and methyl methacrylate in weight proportions of about 2:1.

11. A housepaint as recited in claim 10 in which the final acid value is in the range of from 15 to 60 and the hydroxy value is at least 25.

References Cited

UNITED STATES PATENTS

| | | | |
|---|---|---|---|
| 2,908,663 | 10/1959 | Masters | 260—837 |
| 3,250,734 | 5/1966 | Sekmakas | 260—23 |
| 3,251,790 | 5/1966 | Christenson et al. | 260—18 |
| 3,308,077 | 3/1967 | Pattison et al. | 260—23 |
| 3,330,814 | 7/1967 | Vasta | 260—88.1 |
| 3,392,129 | 7/1968 | Hoy et al. | 260—22 |

FOREIGN PATENTS

| | | |
|---|---|---|
| 1,526,939 | 4/1968 | France. |

OTHER REFERENCES

Derwent, Belgian Patents Report No. 24/67, Plastics, Metal Finishing, p. 2, Abstract of No. 690,753, June 6, 1967.

DONALD E. CZAJA, Primary Examiner

R. A. WHITE, Assistant Examiner

U.S. Cl. X.R.

260—22, 23.7

PO-1050
(5/69)

UNITED STATES PATENT OFFICE
CERTIFICATE OF CORRECTION

Patent No. 3,558,536      Dated January 26, 1971

Inventor(s) Kazys Sekmakas

It is certified that error appears in the above-identified patent and that said Letters Patent are hereby corrected as shown below:

Column 3, line 31, "acids" (second occurrence) should read --acid--
    Column 3, line 32 "acids" should read --acid--
    Column 3, line 52, "adductive" should read--adduction--
    Column 5, line 69, there should be a hyphen (-) between "styrene" and "alkyl", --styrene-alkyl--
    Column 6, line 60, "27.0" should read --0.27--
    Column 7, line 11, "strtam" should read --steam--
    Column 9, line 19, delete the entire line.

Signed and sealed this 6th day of July 1971.

(SEAL)
Attest:

EDWARD M. FLETCHER, JR.      WILLIAM E. SCHUYLER, JR.
Attesting Officer      Commissioner of Patents